July 10, 1934.　　　　M. J. HANSON　　　　1,965,772
ELECTRIC CLOCK MOTOR
Filed March 3, 1932　　　2 Sheets-Sheet 1
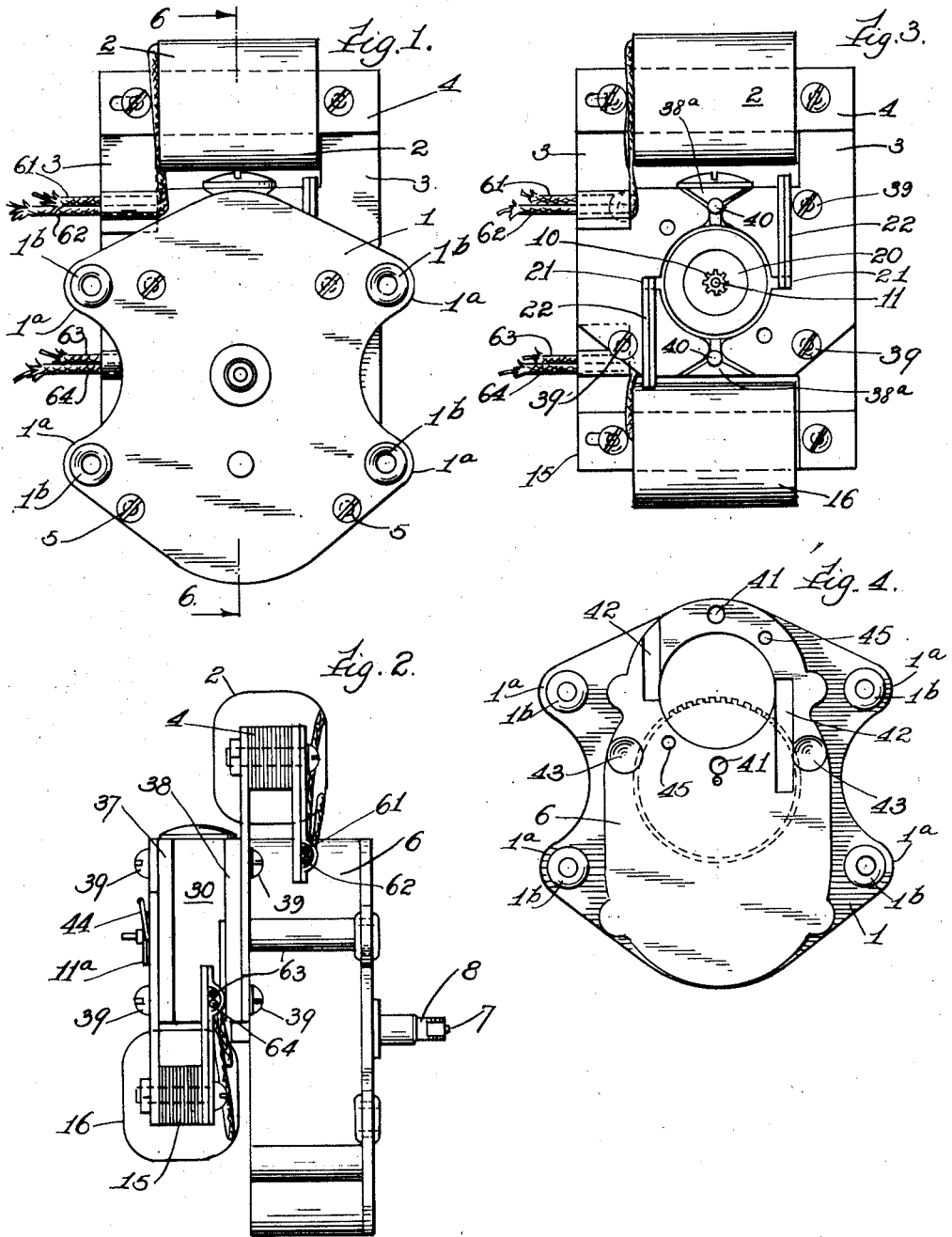
Inventor:
Martin J. Hanson
by his Attorneys.
Witness July 10, 1934.    M. J. HANSON    1,965,772
ELECTRIC CLOCK MOTOR
Filed March 3, 1932    2 Sheets-Sheet 2
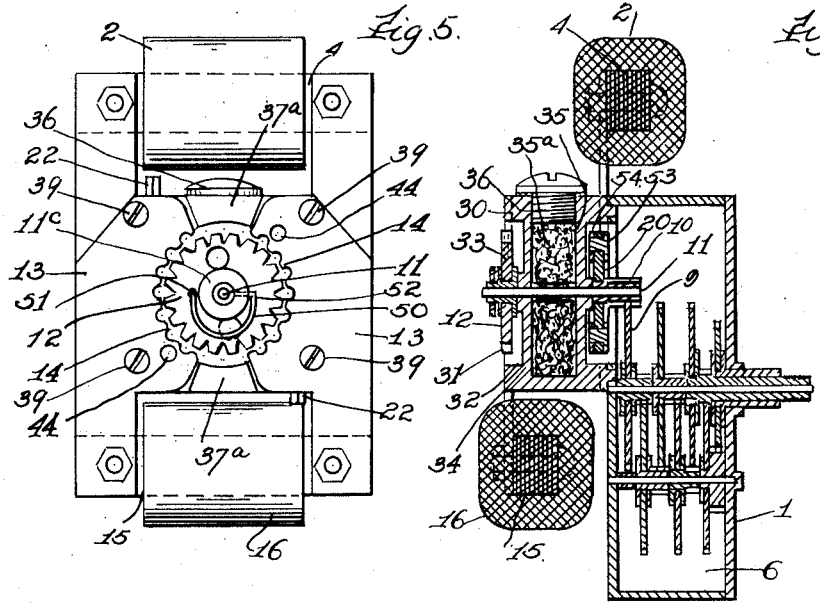
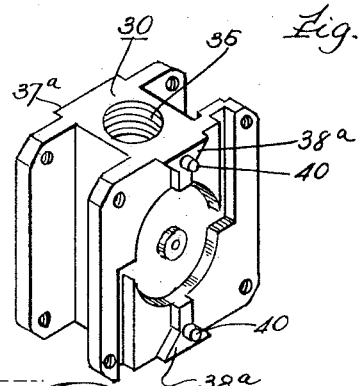
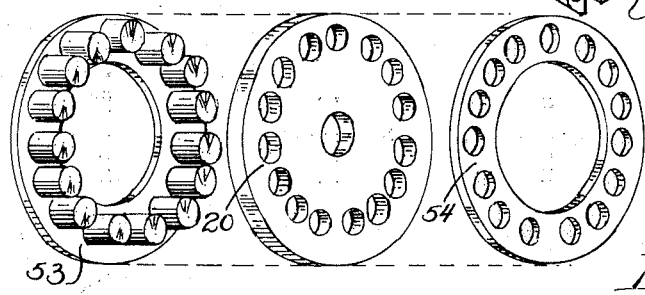
Inventor,
Martin J. Hanson.
by his Attorneys
Witness.

Patented July 10, 1934

1,965,772

UNITED STATES PATENT OFFICE 1,965,772

ELECTRIC CLOCK MOTOR

Martin J. Hanson, Oak Park, Ill., assignor to Electric Corporation, Chicago, Ill., a corporation of Illinois Application March 3, 1932, Serial No. 596,583

5 Claims. (Cl. 172—275)

This invention relates to alternating current motors of the synchronous and induction types, and it is particularly concerned with a dual motor designed to furnish the power for driving a clock train, together with certain features of the clock train itself and the mounting therefor. It consists of certain features and elements of construction in combination as herein shown and described, and as indicated by the claims.

In the drawings:

Figure 1 is a front elevation of an electric motor and clock train constructed in accordance with this invention.

Figure 2 is a side elevation of the same.

Figure 3 is a front elevation of the motor with the clock gear train removed.

Figure 4 is a rear elevation of the housing provided for the clock train.

Figure 5 is a rear elevation of the motor.

Figure 6 is a vertical section taken substantially as indicated at line 6—6 on Figure 1.

Figure 7 is a perspective view of the die casting which serves as a mounting and bearing block for the motor parts.

Figure 8 is an inner face view of the rotor for the non-synchronous motor.

Figure 9 is a perspective view indicating the method of assembling the parts of the rotor shown in Figure 8.

The alternating current motor herein shown is somewhat similar to that shown and described in my co-pending application Serial No. 512,521, filed January 31, 1931, particularly in that it includes a strictly synchronous motor of the induction type for continuous operation of the clock train, and a non-synchronous motor which is employed temporarily for starting the synchronous motor. Details of construction have been altered, however, for convenience and facility of manufacture, and to improve the operating qualities of the mechanism.

Figure 1, being a front elevation of the motor and the enclosed clock train, illustrates the front plate, 1, of the housing for the clock train, and shows the position of the field coil, 2, for the synchronous motor, together with the polar extensions, 3, 3, of the laminated field magnet, 4. The plate, 1, is formed with laterally extending lugs or ears, 1ª, each fitted with a rubber bushing, 1ᵇ, to provide a cushioned mounting for the dial plate of the clock, not shown. Screws, 5, secure the front plate, 1, to the gear housing proper, which is seen at 6 in Figures 2 and 4. Within the housing, 6, are mounted the reduction gears through which are driven the spindle, 7, for the minute hand, and the hollow spindle, 8, for the hour hand. The initial gear, 9, of the train is preferably of fiber and meshes with a pinion, 10, on the shaft, 11, of the synchronous motor, as seen in Figure 6. The use of this fiber gear, together with the complete enclosure of the train in the non-resonant housing, 6, results in thoroughly muffling any noise which the operation of the train might cause, so that the clock, when running, is entirely silent.

I find that when the housing, 6, and its front plate, 1, are made as die castings of any standard white metal alloy, they form a suitably non-resonant enclosure to ensure this result.

The synchronous motor consists of a toothed rotor, 12, on the shaft, 11, and field plates, 13, 13, which are formed with curved dentate portions at 14 adjacent the periphery of the rotor, 12. These plates are secured to the ends of the laminated core, 15, of the field coil, 16.

The non-synchronous motor comprises a rotor, 20, on the shaft, 11, with field plates which are integral portions of the polar extensions, 3, 3, secured to the core, 4, of the field coil, 2. Each of said field plates has an arcuately curved outline extending closely adjacent the periphery of the rotor, 20, and this arcuate portion is divided into two segments by a notch at 21 which accommodates a flat copper shading coil, 22, whose function is well understood in the art as producing the required lag in the magnetic flux which results in rotation of the rotor, 20.

The polar extensions, or field plates, 3, 3, of the non-synchronous motor, and the field plates, 13, 13, of the synchronous motor are all supported in fixed relation upon a unitary bearing and block, 30, which is formed as a die casting and includes bearings at 31 and 32 for the shaft, 11. Intermediate these bearings the casting contains a relatively large oil well, 33, which is preferably occupied by suitable absorbent material, such as felt or wicking, indicated as consisting of two sections, 34, which is a plug occupying the lower portion of the well, and 35, which is a plug in the upper portion of the well having a notch at 35ª, to make room for the shaft, 11. These absorbent plugs, 34 and 35, are thoroughly saturated with suitable lubricant, such as a light oil, and the well is then closed with a screw plug, 36. This provides sufficient lubricant for the bearings, 31 and 32, to keep them in running condition for many years; if it should ever be necessary to replenish the supply it can be accomplished very simply upon removal of the screw plug, 36.

In addition to the well, 33, the die casting, 30, includes laterally extending flanges, 37 and 38, to which are secured respectively the field plates of the synchronous and non-synchronous motors. Each of the flanges is drilled and tapped for four screws, 39, so that each field plate or polar extension member is secured to the central die casting, 30, by two of these screws. The flange, 37, is formed with central bosses, 37ª, shaped to fit between the edges of the opposed field plates, 13, and standing substantially flush with the outer faces of said plates when the latter are secured to the casting. Similarly, the flange, 38, is formed with bosses, 38ª, as seen in Figure 3, disposed between the mitered corners of the field plates, 3, and each of these bosses also includes an upstanding cylindrical dowel portion, 40. These dowels register with and enter positioning holes, 41, in the rear face of the fast housing, 6. Said face is also formed with channels, 42, to accommodate the edges of the shading coils, 22, and with circular recesses, 43, to receive two of the screws, 39, which project above the faces of the field plates, 3. Thus the rear wall of the housing, 6, may be assembled flatly against the field plates, 3, 3, and is secured in this position by means of two screws, 44, which extend through the plates, 13, of the synchronous motor and through both flanges, 37 and 38, of the die cast mounting block, as well as the field plates, 3, of the other motor for engagement with tapped holes, 45, in the back wall of the housing, 6. The gear train, being assembled completely within the housing, 6, when its front cover plate, 1, is applied, it becomes a very simple matter to register the rear wall of said housing, 6, in position against the field plates, 3, 3, with the pinion, 10, engaging the fiber gear, 9, and then to fix the parts in this relation by means of the two screws, 44.

For the sake of compactness fore-and-aft, the laminated core, 15, of the lower coil, 16, is secured to the forward faces of the field plates, 13, so that said coil is disposed mainly below the die cast mounting block, 30. The upper coil, 2, of the other motor is set out of the plane of the mounting block by having its laminated core, 4, secured to the front faces of the field plates, 3, 3. This leaves the plug, 36, accessible for removal if renewal of the lubrication should be required.

A feature of the synchronous motor described in my said co-pending application Serial No. 512,521, is the loose mounting of the rotor on the shaft with a yielding drive connection. In the present construction this yielding drive takes the form of a loop of spring wire, 50, having one end bent at right angles to its plane, and entering an aperture, 51, in the face of the rotor, 12, and having its opposite end extending radially at 52 into an aperture in the edge of the hub, 11ª, which is fixed to the shaft, 11.

In my aforesaid application the rotor of the non-synchronous motor is made with a notched periphery but its opposite faces are copper-plated to provide suitable paths for induced currents in the rotor, said faces being electrically connected by the plating of the edges of the notches. In addition, the disk is provided with a continuous tire of conducting material, such as copper, bridging the notches. In the present construction the same result is obtained by punching in the steel disk, which serves as the body of the rotor, 20, a series of apertures adjacent its periphery, and attaching to opposite faces of the disk a pair of copper rings, 53 and 54. The ring, 53, is formed with upstanding projections on its inner face which enter the apertures in the steel disk, 20, and extend through similar registering apertures in the copper ring, 54. By a suitable hammer blow or pressure these projections are expanded sufficiently to fit tight both in the steel disk, 20, and in the ring, 54, thus firmly securing the parts in assembled relation, and also serving to electrically connect the two copper rings, thus providing the desired paths for the induced currents in the rotor. It will be understood that the presence of the apertures in the steel rotor disk, 20, gives the non-synchronous motor a tendency to favor a certain synchronous speed, but does not prevent it from attaining a higher speed, or from operating with some effective torque at lower speeds in getting the mechanism under way. Lead wires, 61 and 62, are shown extending from the field coil, 2, and similar lead wires, 63 and 64, connect with the coil, 16. These wires may be understood as running to any suitable switch mechanism, such as that shown and described in my previous application Serial No. 512,521, for supplying current first to the field coil, 2, for propelling the rotor, 20, and bringing the synchronous motor up to speed and then for switching the current to the field coil, 16, for continuous operation of the synchronous rotor, 12, and of the clock train driven thereby.

I claim:

1. In an induction motor comprising a shaft, a rotor disk thereon, and field plates disposed in the plane of the rotor, a mounting member having spaced walls each providing a journal bearing for said rotor shaft, the space between said walls accommodating a chamber through which the shaft extends, said chamber serving as an oil well furnishing lubricant for both the bearings.

2. In an induction motor comprising a shaft, a rotor disk thereon, and field plates disposed in the plane of the rotor, a mounting member having spaced walls each providing a journal bearing for said rotor shaft, the space between said walls providing a vertically elongated chamber serving as an oil well through which the shaft extends transversely and which communicates with both of the journal bearings, a removable closure member secured in the upper end of said well, and absorbent material occupying the space in the well for contact with the shaft.

3. In an induction motor comprising a shaft, a rotor disk thereon, and field plates disposed in the plane of the rotor, a mounting member having spaced walls each providing a journal bearing for said rotor shaft, said field plates being fixed to the outer face of one of said walls and a laminated bar magnet forming the core of the field coil of the motor affixed to the plates at the same side thereof as the mounting member.

4. A dual induction motor comprising a casting having a central chamber with two opposite side walls extended to form parallel flanges in spaced relation, a pair of field plates supported by each of said flanges, a shaft extending through said chamber transversely of the flanges and disposed between the opposed arcuate edges of the plates of each pair, and two rotor disks on said shaft each positioned adjacent one flange of the mounting member and substantially in the same plane as the field plate supported thereon.

5. A dual induction motor comprising a shaft carrying two rotor disks in spaced relation, a mounting block in which the shaft is journaled between said disks, said block having a central oil well between its spaced side walls which provide bearings for the shaft adjacent the disks respectively, said walls extending in planes perpendicular to the shaft beyond said well to form mounting flanges, a field coil with its core and a pair of polar extensions constituting field plates secured to said flanges at one side of the mounting block with said plates substantially in the plane of the rotor at that side, said coil itself being disposed vertically beyond said mounting block, a second field coil with its core and a pair of flat polar extensions therefrom secured to the flanges at the opposite side of the mounting block substantially in the plane of the other rotor, said coil being disposed directly below said mounting block while the first mentioned coil is offset to leave the upper side of said mounting block clear for access to the well disposed therein between the flanges of the block.

MARTIN J. HANSON.

CERTIFICATE OF CORRECTION.

Patent No. 1,965,772.    July 10, 1934.

MARTIN J. HANSON.

It is hereby certified that error appears in the printed specification of the above numbered patent requiring correction as follows: Page 1, line 4, heading to the specification, for "Electric Corporation" read Electra Corporation; and that the said Letters Patent should be read with this correction therein that the same may conform to the record of the case in the Patent Office.

Signed and sealed this 11th day of September, A. D. 1934.

(Seal)

Leslie Frazer
Acting Commissioner of Patents.